United States Patent [19]

Goetz et al.

[11] Patent Number: 5,286,885
[45] Date of Patent: Feb. 15, 1994

[54] PROCESS FOR PREPARING GLYCIDE BY EPOXIDATION USING POLYMERIC ORGANOSILOXANE AMMONIUM SALTS OF OXOACIDS OF THE ELEMENTS V, NB, TA, MO, AND W

[75] Inventors: Peter Goetz, Rosbach; Stefan Wieland, Offenbach; Peter Panster, Rodenbach; Gustaaf Goor, Hanau; Rainer Siegmeier, Bad Homburg, all of Fed. Rep. of Germany

[73] Assignee: Degussa Aktiengesellschaft, Frankfurt am Main, Fed. Rep. of Germany

[21] Appl. No.: 53,248

[22] Filed: Apr. 28, 1993

Related U.S. Application Data

[62] Division of Ser. No. 809,447, Dec. 19, 1991.

[30] Foreign Application Priority Data

Dec. 19, 1990 [DE] Fed. Rep. of Germany ....... 4040568

[51] Int. Cl.$^5$ ................ C07D 301/12; C07D 303/14
[52] U.S. Cl. ................ 549/531; 525/389;
525/474; 525/475; 528/9; 528/28; 528/38;
528/39; 528/395; 568/680
[58] Field of Search .......................... 549/531

[56] References Cited

U.S. PATENT DOCUMENTS

| | | | |
|---|---|---|---|
| 2,592,273 | 4/1952 | Goebel et al. | 528/395 |
| 3,242,171 | 3/1966 | Schumultzler | 528/395 |
| 4,343,922 | 8/1982 | Shaffer | 525/389 |
| 4,410,669 | 10/1983 | Panster et al. | 525/474 |
| 4,424,332 | 1/1984 | Panster et al. | 528/30 |
| 4,588,799 | 5/1986 | Petersen | 528/9 |
| 4,647,679 | 3/1987 | Panster et al. | 556/9 |
| 4,845,163 | 4/1989 | Panster et al. | 525/475 |
| 4,864,041 | 9/1989 | Hill | 549/531 |
| 4,954,599 | 9/1990 | Panster et al. | 528/38 |
| 5,130,396 | 7/1992 | Panster et al. | 528/9 |

FOREIGN PATENT DOCUMENTS

| 0151991 | 8/1985 | European Pat. Off. | |
| 2408948 | 9/1975 | Fed. Rep. of Germany | 549/531 |

OTHER PUBLICATIONS

S. N. Borisov et al., *Organosilicon Heteropolymers and Heterocompounds*, Plenum Press, New York, 1970, beginning at p. 512.
N. I. Sax et al., *Hawley's Condensed Chemical Dictionary*, Eleventh Edition, Van Nostrand Reinhold Co., New York, (1987), pp. 118, 122, 203, 210, 1057 and 1076.
Chemical Abstract No. 117(9):90054g (1992).
Chemical Abstract No.108(13):111856b (1987).
Chemical Abstract No. 95(2):8242n (1981).
Chemical Abstract No. 81(6);26177k (1974).
Chemical Abstracts No. 113(9):77729d (1990).
Chemical Abstract No. 83(19):163981y (1975).
Chemical Abstract No. 100(10):74642r (1983).
Chemical Abstract No. 110(21):192543p (1988).
Chemical Abstract No. 108(5):37258q (1987).
Chemical Abstract No. 112(23):215947f (1989).

*Primary Examiner*—Joseph E. Evans
*Attorney, Agent, or Firm*—Beveridge, DeGrandi, Weilacher & Young

[57] ABSTRACT

The invention relates to polymeric organosiloxane ammonium salts having a silica-like skeleton and including units of Formula (I):

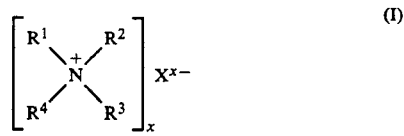

wherein $R^1$ and $R^2$ are identical or different and signify a group of Formula (II):

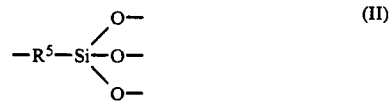

wherein $R^5$ is an alkylene group and the oxygen atoms are saturated by silicon atoms of additional groups corresponding to Formula (II), optionally with the insertion of cross-linking agents; $R^3$ represents groups corresponding to $R^1$ or $R^2$, or hydrogen or an alkyl group; $R^4$ represents hydrogen or an alkyl group; x is the charge number of an oxo anion of a monooxo-, isopolyoxo- or heteropolyoxo acid of the elements vanadium, niobium, tantalum, molybdenum or tungsten; and oxo groups of the X anion also may be replaced by peroxo groups. The invention also includes methods of preparing the salts of Formula (I) from salts of the type $(R^1R^2R^3R^4N^+)_yY$ wherein Y is different from X. The invention further includes the use of the salts of Formula (I) as catalyst for oxidation reactions using peroxo compounds as an oxidation agent.

14 Claims, No Drawings

PROCESS FOR PREPARING GLYCIDE BY EPOXIDATION USING POLYMERIC ORGANOSILOXANE AMMONIUM SALTS OF OXOACIDS OF THE ELEMENTS V, NB, TA, MO, AND W

This is a divisional of co-pending application Ser. No. 07/809,447 filed on Dec. 19, 1991, which application is entirely incorporated herein by reference.

BACKGROUND OF THE INVENTION

This invention relates to polymeric organosiloxane ammonium salts, which include a silica-like skeleton, of oxo acids of the elements vanadium, niobium, tantalum, molybdenum and tungsten. The term "oxo acids" as used in this application represents simple oxo acids, isopolyoxo acids and heteropolyoxo acids. Furthermore, in accordance with this invention, one or several oxo groups may be replaced by peroxo groups. This invention also relates to the preparation of these salts, as well as the use of the salts as catalysts for oxidation reactions, especially reactions using hydrogen peroxide as the oxidizing agent.

Polymeric organosiloxane ammonium salts with silica-like skeletons have been described in German Patent No. 31 20 195. This patent is entirely incorporated herein by reference. A further development of the salts described in this German patent relate to macroscopically spherical particles with specific properties, as disclosed in German Patent No. 38 00 564, which patent also is entirely incorporated herein by reference. The macroscopically spherical, polymeric, tertiary or secondary organosiloxane amine compounds which form the base for the salts of German Patent No. 38 00 564 can be transferred into salts by means of quaternization with, for example, alkyl halogenides, or by means of reaction with a protonic acid, as described in German Patent No. 38 00 563. This German patent also is completely incorporated herein by reference.

The polymeric salts of German Patent No. 31 20 195 and German Patent No. 38 00 564 include units of formula (III)

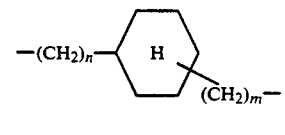

in which $R^1$ and $R^2$ are identical or different and signify a group of formula (II):

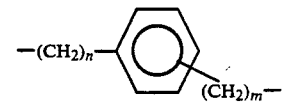

The nitrogen atoms in Formula (III) are connected via the $R^5$ groups to the silicon atoms in Formula (II), and $R^5$ represents an alkylene group with 1 to 10 carbon atoms, a cycloalkylene group with 5 to 8 carbon atoms or a unit of one of the following formulae:

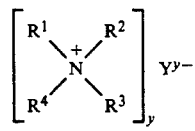

or

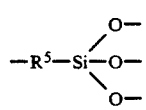

wherein n is a number from 1 to 6 and indicates the number of methylene groups in the nitrogen position; m is a number from 0 to 6; the free valences of the oxygen atoms bound to the silicon atom are saturated as in silica skeletons by silicon atoms of further groups corresponding to formula (II) and/or with the metal atoms of one or several of the cross-linking bridge-type cross links

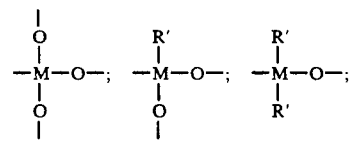

or

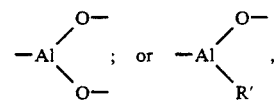

in which M is a silicon, titanium or zirconium atom and R' is a linear or branched alkyl group with 1 to 5 carbon atoms; the ratio of the silicon atoms from the groups of formula (II) to the metal atoms in the bridge-type cross links is 1:0 to 1:10; in which $R^3$ is equal to $R^1$ or $R^2$ or hydrogen, a linear or branched alkyl group of 1 to 20 carbon atoms, a cycloalkyl group having 5 to 8 carbon atoms or a benzyl group; $R^4$ represents hydrogen, a linear or branched alkyl group with 1 to 20 carbon atoms or a cycloalkyl, benzyl, allyl, propargyl, chloroethyl, hydroxyethyl, or chloropropyl group having 5 to 8 carbon atoms; and Y is an anion with the valence of y equal to 1 to 3 selected from the group of halogenide, hypochlorite, sulfate, hydrogen sulfate, nitrite, nitrate, phosphate, dihydrogen phosphate, hydrogen phosphate, carbonate, hydrogen carbonate, hydroxide, chlorate, perchlorate, chromate, dichromate, cyanide, cyanate, rhodanide, sulfide, hydrogen sulfide, selenide, telluride, borate, metaborate, azide, tetrafluoroborate, tetraphenylborate, hexafluorophosphate, formate, acetate, propionate, oxalate, trifluoroacetate, trichloroacetate or benzoate.

It is also known from the above mentioned German patents that the Y anion can be exchanged in polymeric salts of Formula (III) by means of a static or dynamic ion exchange with another anion from the above-named series.

These German patents indicate that the polymeric organosiloxane ammonium salts are used as ion exchangers, absorbers, catalytic carriers and active-substance carriers. No information is included in these German patents concerning the selection of the X anion for use in definite reactions which are carried out in the presence of heterogeneous catalysts.

It is known that oxidation reactions using peroxo compounds, especially hydrogen peroxide, can be catalyzed by means of oxo compounds of, for example, molybdenum, tungsten and vanadium. The intermediary formation of peroxo acids of Mo, W and V is considered as an essential step. Among the oxidation reactions catalyzed in this manner, the following reactions can be named as examples: Olefin epoxidation; olefin hydroxylation; olefin splitting; oxime formation from ketones with ammonia and hydrogen peroxide; sulfenamide formation from a thiol, an amine and hydrogen peroxide as well as the oxidation of thiols to higher-oxidized sulfur compounds, cf. the brochure of the firm Peroxid-Chemie GmbH "$H_2O_2$ in der organischen Synthese" (which translates to: "$H_2O_2$ in Organic Synthesis") A 0.1.2.dlD-381, which is entirely incorporated herein by reference. One disadvantage of using the abovedescribed catalysts is the fact that the recovery of the dissolved catalysts is technically expensive, and therefore, the economy of the oxidation reactions is frequently questionable. Practically speaking, the use of, for example, molybdate-charged ion exchangers or tungstate-charged ion exchangers based on organic polymers does not constitute a satisfactory solution because of the generally insufficient thermal, mechanical and chemical stability.

BRIEF DESCRIPTION OF THE INVENTION

The present invention is directed to expanding the palette of available polymeric organosiloxane ammonium compounds. A further objective of the invention relates to a method for preparing these compounds in such a manner that the desired physical properties and a high catalytic activity is assured. Finally, the compounds in accordance with this invention are suitable as heterogeneous catalysts for oxidation reactions and should not exhibit the disadvantages of the previously known heterogeneous catalysts.

DETAILED DESCRIPTION OF THE INVENTION

The products in accordance with the invention are of formula (I):

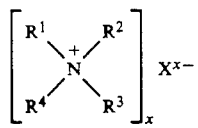

(I)

wherein $R^1$, $R^2$, $R^3$ and $R^4$ have the same meaning as in formula (III) above, and x is the charge number of the X anion.

These polymeric organosiloxane ammonium salts are characterized in that X is an anion of a monooxo-, isopolyoxo-or heteropolyoxo acid of the elements vanadium, niobium, tantalum, molybedenum or tungsten. Further, one or several oxo groups of the anion can be replaced by peroxo groups and an element selected from of the series of boron, silicon, germanium, phosphorus, arsenic, iodine, tellurium, tin, titanium, zirconium, hafnium and cerium functions as a heteroatom in the heteropolyoxy acids.

The anions of the salts in accordance with the invention exhibit different structures and valences. Which structure is present is strongly dependent on the pH; in alkaline solutions, essentially the mono-oxo anions are present, which condense with falling pH to the isopolyoxo anions. Thus, several anions with differing structure may also be present in the polymeric salts. Moreover, in the presence of hydrogen peroxide, oxo groups can be replaced by peroxo groups, in which instance the structure and stability of the anions containing peroxo groups is again pH-dependent. A survey of possible structures of systems containing monooxo-, isopolyoxo- and heteropolyoxo anions including the peroxo groups is offered e.g. by the "Lehrbuch der anorganischen Chemie" (which translates to "Textbook of Inorganic Chemistry") by H. Remy, volume II (1961), pages 125-128 (vanadates), 132-134 (niobates), 138-139 (tantalates), 204-207 (molybdates) and 215-225 (tungstates), which references are incorporated herein by reference. Note especially among the mono-oxo anions: ortho- and metavanadate ($VO_3^{3-}$ and $VO_3^-$), metaniobate ($NbO_3^-$), metatantalate ($TaO_3^-$), monomolybdate ($MoO_4^{2-}$) and monotungstate ($WO_4^{2-}$). The following are especially preferred as the isopoly acid anions: $V_2O_7^{4-}$, $V_4O_{12}^{4-}$, $V_{10}O_{28}^{6-}$, $Nb_5O_{16}^{7-}$, $Ta_5O_{16}^{7-}$, $HMo_6O_{21}^{5-}$, $Mo_7O_{24}^{6-}$, $Mo_8O_{26}^{4-}$, $H_7Mo_{12}O_{41}^{3-}$, $HW_6O_{21}^{5-}$, $H_3W_6O_{21}^{3-}$, $H_2W_{12}O_{40}^{6-}$, and $W_6O_{24}^{12-}$.

The anions of the heteropoly acids with a heteroatom are generally formulated for use with this invention as follows: $(B(W_3O_{10})_4)^{5-}$, $(Si(W_3O_{12})_4)^{4-}$, $(Ge(W_3O_{12})_4)^{4-}$, $(P(W_3O_{10})_4)^{3-}$, or $(As(W_3O_{10})_4)^{3-}$.

Among the anions containing peroxo groups, the following may be used in accordance with this invention: diperoxo- or orthovanadate $(VO_2(O_2)_2)^{3-}$, dioxomonoperoxo($NbO_2(O_2)$)$^-$ and tetraperoxoniobate $(Nb(O_2)_4)^{3-}$ and the corresponding tantalates; $(HMoO_2(O_2)_2)^-$, $(Mo(O_2)_4)^{2-}$, $(W_2O_3(O_2)_4)^{2-}$, $(W(O_2)_4)^{2-}$.

Preferred salts of the formula $(R^1R^2R^3R^4N)_xX^{x-}$ (I) are present in the form of macroscopically spherical particles with a diameter in the range of 0.01 to 3.0 mm, a specific surface according to BET of greater than 0 to 1000 m²/g, a specific pore volume of greater than 0 to 6 ml/g, a bulk density in the range of 100 to 1000 g/l, as well as a volume density of dry substance in the range of 100 to 900 g/l. These material properties are exhibited essentially by the salts of the general formula $(R^1R^2R^3R^4N)_yY^{y-}$ (III) preferably used as the initial starting materials for their preparation, which initial starting materials are accessible according to German Patent No. 38 00 564 and in which $R^1$, $R^2$, $R^3$ and $R^4$ have the same meaning as in formula (I) and Y stands for a previously known anion of valence y from 1 to 3. Even if the polymeric organosiloxane amino compounds according to German Patent No. 38 00 563 of formula $R^1R^2R^3N$ (IV), in which $R^1$, $R^2$, and $R^3$ again have the same meaning as in formula (I), serve as the initial starting materials for the preparation of the salts of formula (I), salts with the desired material data are obtained. This material data is advantageous with regard to the use of the substances as catalysts for oxidation reactions, because the catalysts have a defined pore structure, a high mechanical stability and are easy to handle.

Further preferred salts in accordance with the invention are characterized in that $R^1$, $R^2$ and $R^3$ are identical and signify a group according to formula (II), in which $R^5$ represents a linear or branched alkylene group and $R^4$ represents hydrogen or preferably a methyl group. Salts with the formula unit:

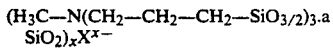

or

in which "a" assumes a value between 0 and 3, are especially preferred.

As already mentioned, the salts in accordance with the invention may be used as catalysts for oxidation reactions using peroxo compounds, especially hydrogen peroxide. An especially high activity is displayed by salts in which the X anion is selected from the group of mono-, hexa-, dodecatungstates; mono-, hexa-, hepta- and octamolybdates; tungstophosphate; tungstosilicate or tungstoborate, of which the tungstates and tungstophosphates are especially preferred. Since the catalytically active, polymer-bound anions should not be separated from the polymer during the oxidation reaction, if possible, then salts with $R^3$ and $R^4$ not equal to hydrogen are preferred. In addition, conditions are to be avoided when using these salts, if under the conditions the X anions could be converted into cations of the catalytically active element and/or could be dissolved in some other manner out of the fixed state, for example, by means of the presence of large amounts of substitutable anions other X, and then removed out of the system.

The defined pore structure of the salts, which can be readily adapted to the particular application, especially a pore structure with large pore diameters, assures a reliable attachment of large oxo-, isopolyoxo- and heteropolyoxo anions of the elements V, Nb, Ta, Mo and W, which anions can optionally also include peroxo groups. The polymeric salts in accordance with the invention are stable against oxidation in comparison to previously known anion exchangers based on purely organic polymers. Furthermore, the salts also exhibit a greater temperature stability and, especially in the form of the macroscopically spherical particles, a high mechanical strength which make it possible to use the polymeric salts in agitated reactors, fluid bed or fixed bed reactors. The previously known polymeric salts of formula (III) are not oxidation catalysts. The salts of the invention activate peroxo compounds, especially those of the series of hydrogen peroxide and $H_2O_2$-liberating compounds such as alkali- and alkaline-earth peroxides, percarbonates, perborates, percarbamides, peroxophosphates, peroxomono- and -disulfates. The salts of the invention are well suited as catalysts for the epoxidation of aliphatic and cycloaliphatic olefins, for the preparation of vicinal diols from olefins as well as for further oxidation reactions like those known from the state of the art and for which in the past water-soluble salts of oxo-, isopolyoxo- and heteropolyoxo acids of the elements V, Nb, Ta, Mo and W or the acids themselves were used but entailed an expensive workup. The use of the polymeric salts in accordance with the invention, which are insoluble in water, permits a very simple workup of the reaction mixture after the oxidation.

The salts in accordance with the invention may also be used in waste-water treatment as catalysts for the oxidation of organic substances contained in waste water by means of peroxo compounds. Since water-soluble tungsten-oxygen compounds are used in the generic method of EP-B 0,221,689 (which is entirely incorporated herein by reference) as a catalyst in order to oxidize organic sulfides with $H_2O_2$, the expensive catalyst remains in the treated water, which reduces the economy and further becomes a pollutant which remains in the water. The use of the salts in accordance with the invention, which are completely insoluble in the water to be treated, makes this method not only simple but also economical and compatible with the environment.

The polymeric salts of formula (I) can be obtained by exchanging the anion of a salt of formula (II), in which Y preferably signifies chloride, phosphate or hydroxide, with the X anion in accordance with the static or dynamic exchange principles. This exchange customarily takes place in the presence of an aqueous solution which at first contains a sufficiently water-soluble compound of the X anion which can be dissociated into an anion and cation, especially of the acid $H_zX$ or of an alkali- or ammonium salt of this acid, and which solution receives the exchanged Y anion. Thus, the method of preparing the salts of formula (I) is characterized in that a compound of the formula $A_zX$ is used as a dissociable compound in which A stands for a cation of the series $H^+$, $Li^+$, $Na^+$, $K^+$ as well as $NH_4^+$; X represents an anion of a monooxo-, isopolyoxo-or heteropolyoxo acid of the elements vanadium, niobium, tantalum, molybdenum or tungsten; and z indicates the number of cations required for charge equalization, wherein the anion of the heteropoly acid comprises boron, silicon, germanium, phosphorus, arsenic, iodine, tellurium, tin, titanium, zirconium, hafnium or cerium as a heteroelement and one or several of the oxo groups of anion X can be replaced by peroxo groups and, to the extent desired, one or several of the oxo groups on the anion of the polymeric organosiloxane ammonium salt $(R^1R^2R^3R^4N)_xX$ formed at first is (are) converted after the ion exchange into peroxo groups by means of treatment with an aqueous hydrogen peroxide solution. A complete exchange requires at least the stoichiometric amount of the compound of the X anion. It also is possible, in principle, to obtain polymeric salts with more than one anion from the X series or those with X and Y and to use them as catalysts for oxidation reactions. If the exchange is carried out using neutrally, basically, or acidically reacting salts of the X anion, it may be necessary to adjust to a predetermined pH by means of the addition of acids or lyes and to maintain it during the exchange. The pH is preferably maintained constant in the range of 4 to 7, especially 4.5 to 6 and advantageously at approximately 5. The ion exchange method, which is also described in German Patent No. 38 00 564, also includes the neutralization of a salt of formula (III) in which Y is hydroxide. If the X anion is to be introduced in a halogenide-free medium, for example, in order to be able to work in an acidic medium and to obtain a very uniform charging, preferably, salts of formula (III) with Y being, for example, a sulfate, a phosphate, a nitrate, a carbonate or an acetate are used.

According to an alternative method of preparing salts of formula (I), polymeric organosiloxane amines of the formula (IV)

(IV)

such as those described in German Patent No. 38 00 563 and in which $R^1$, $R^2$ and $R^3$ have the same meaning as in formula (I), are reacted with at least a stoichiometric amount, and preferably an excess amount of an inorganic protonic acid of a monooxo-, isopolyoxo- or heteropolyoxo acid of formula $H_2X$ of the elements vanadium, niobium, tantalum, molybdenum or tungsten in which z signifies the number of protons required for charge equalization and X represents the anion. The heteroatom in the heteropoly acids may be boron, silicon, germanium, phosphorus and arsenic. To the extent desired, one or several of the oxo groups of the polymeric organosiloxane ammonium salt of formula $(R^1R^2R^3NH)_x X$ formed at first can be converted into peroxo groups after the reaction by means of treatment with an aqueous solution of hydrogen peroxide, giving rise to salts of formula $(R^1R^2R^3NH)_{x'}$ X' in which X' is an anion based on the X anion and containing a peroxo group and x' is its valance. The conversion of oxo groups into peroxo groups preferably takes place at 20° to 100° C., especially at 40° to 80° C. using aqueous $H_2O_2$ solutions with a content in the range of preferably 5 to 30% by weight $H_2O_2$.

In the preparation methods, starting with salts of formula (III) as well as also amines of formula (IV), the especially preferred, tungsten- and molybdenum-containing salts are obtained using the tungsten- and molybdenum-containing acids $H_2X$; among the tungsten-containing acids, mono- and hexatungstic acid as well as tetratritungstosilica and tetratritungstophosphoric acid are preferred.

Of course, the structure of the X anions in the polymeric salts of formula (I) can vary by means of varying the pH; intensified condensation occurs upon shifting the pH from the alkaline into the acidic range. When treating salts of formula (I) with $H_2O_2$ solutions, a structural change can proceed parallel to the exchange of oxo groups with peroxo groups. One skilled in the art may determine the possible resulting influence of the salts in accordance with the invention on the catalytic activity in oxidation reactions using peroxo compounds in orienting tests.

The following examples are related to the preparation of the salts of the invention and their use. While the invention is described below in conjunction with particular Examples, these Examples are intended to be illustrative of the invention and not limiting of the same.

EXAMPLE 1

1 liter of a polymeric organosiloxane ammonium salt prepared according to Example 1 in German Patent No. 38 00 564 and with the formula unit $((H_3C)N(CH_2CH_2CH_2SiO_{3/2})_3)^+Cl^-$ was washed into 1.5 liters water. 32.99 g $Na_2WO_4.2H_2O$ dissolved in 100 ml water was added thereto and the pH adjusted to about 5.0 with 1 molar HCl. The mixture was agitated at room temperature for 3 hours while the pH was maintained constant at about 5.0 by adding 1 molar HCl. The ammonium siloxane was removed by suction, washed off and used water-moist for oxidation reactions.

EXAMPLE 2

A polymeric organosiloxane amine with the formula unit $N(CH_2—CH_2—CH_2—SiO_{3/2})_3.3SiO_3$ prepared according to Example 3 in German Patent No. 38 00 563 with spherical particles in a granularity of 95% between 0.1 and 1.4 mm was converted by means of a 1-hour treatment with 3% by weight hydrochloric acid (1 liter per 168 g polymer) into the corresponding polymeric ammonium chloride, washed with water and sucked dry on a suction filter.

300 g of the polymeric organosiloxane ammonium chloride prepared in this manner were compounded with 56.2 g $H_3(P(W_{12}O_{40})).xH_2O$ (17% water) dissolved in 1 water. A pH of 5.0 was adjusted with 1 m NaOH and maintained constant and agitated for 5 hours at room temperature. The organosiloxane was removed by suction, charged into a 1 liter 10% by weight $H_2O_2$ solution and agitated for 3 hours at 60° C., then washed, removed by suction and used water-moist for catalytic tests.

EXAMPLE 3

A polymeric organosiloxane amine with the formula $N(CH_2—CH_2—CH_2—SiO_{3/2})_3$ obtained according to Example 1 in German Patent No. 38 00 563 was washed into water after a 4-hour drying at 80° C., 4-hour drying at 100° C. and 16-hour drying at 130° C. The column was then charged with 3% aqueous solution of HCl within 1 hour and then washed with 2 liters water. After a 4-hour drying at 80° C. and a 10-hour drying at 100° C., an ammonium chloride with the formula $\{HN((CH_2)_3SiO_{3/2})_3\}^+Cl^-$ with the following characteristic data was obtained:

| | |
|---|---|
| Grain size: | 0.3–2.0 mm |
| Cl⁻ content: | 10.6% |
| Spec. surface: | 152 m²/g |
| Spec. pore volume: | 0.6 ml/g |
| Bulk density: | 620 g/l |
| Volume density of dry substance: | 500 g/l. |

In accordance with Example 1, the chloride was replaced by tungstate.

Example 4

1 liter of the polymeric organosiloxane ammonium chloride used in Example 1 was suspended in 500 ml water. 24.39 g $NaVO_3$ dissolved in 200 ml water were added thereto, this solution was adjusted to a pH of 5.0 with 1 m HCl and maintained at this pH. The mixture was agitated at room temperature. After 1 hour, the supernatant solution was colorless and the organosiloxane was colored intensively yellow. The mixture was agitated for 5 additional hours, and then a removal by suction was performed. The product was washed and then charged into 500 ml of a 10% by weight $H_2O_2$ solution and agitated for 1 hour at room temperature. The product, which was now a brownish yellow, was removed by suction, washed with water and dried in the air at room temperature.

EXAMPLE 5

In a manner similar to that of Example 4, the polymeric organosiloxane ammonium chloride was reacted with 24.2 g $Na_2MoO_4. 2H_2O$ (instead of the sodium vanadate). The resulting polymeric molybdate turned reddish-brown after having been charged into a 10% by weight aqueous $H_2O_2$ solution.

EXAMPLE 6

This Example relates to the preparation of glycide (also called "glycidol") by means of epoxidation of allyl alcohol. A mixture of 37.9% by weight allyl alcohol, 54.4% by weight water and 7.7% by weight hydrogen peroxide at 55° C. was pumped over a catalytic bed in a thermostatable circulation device in whose reactor a fixed catalytic bed of the salt of Example 1 as the catalyst was located. The catalyst used in this Example had already been used ten times in corresponding batches. After 4 hours, the hydrogen peroxide was completely reacted, and the reaction mixture contained 11.9% by weight glycide, corresponding to 72.2% of theory relative to allyl alcohol. Glycide can be obtained in a known manner by distillation from the reaction mixture drawn off from the circulation apparatus.

It turned out that the catalytic activity of the catalyst freshly prepared according to Examples 1 and 2 increased from batch to batch.

EXAMPLE 7

Example 6 was repeated using the salt of Example 2, which had already been used ten times for this epoxidation reaction. The conversion of $H_2O_2$ was 100% after 4 hours, the yield of glycide relative to allyl alcohol was 76%.

By the term "essentially constant pH" or "constant pH" in this specification, it is intended to refer to as constant of a pH as can be maintained with a commercially available apparatus.

One skilled in the art will recognize that various modifications can be made to the above-described invention without departing from the spirit and scope of the invention as defined in the claims. The above Examples are present to illustrate the invention and are not intended to limit the invention.

The priority document, German Patent App. No. P 40 40 568.0, filed in Germany on Dec. 19, 1990 is relied on and entirely incorporated herein by reference.

We claim:

1. A process for preparing glycide by epoxidation of allyl alcohol, comprising:

contacting a mixture of allyl alcohol, water and hydrogen peroxide with a fixed catalytic bed to thereby form glycide, wherein the catalytic bed includes a polymeric organosiloxane ammonium salt of an oxo acid having a silica-like skeleton, the salt having units of Formula (I):

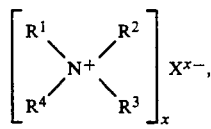

wherein $R^1$ and $R^2$ are identical or different and represent a group of Formula (II):

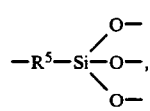

wherein the nitrogen atom in Formula (I) is connected via the $R^5$ group to the silicon atom in Formula (II), and $R^5$ is chosen from the group consisting of an alkylene group with 1 to 10 carbon atoms, a cycloalkylene group with 5 to 8 carbon atoms and a unit of one of the formulae:

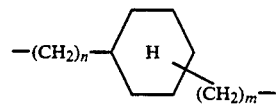

or

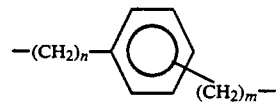

wherein n is a number from 1 to 6 and indicates the number of methylene groups in the nitrogen position and m is a number from 0 to 6; the free valences of the oxygen atoms bound to the silicon atom in Formula (II) are saturated by silicon atoms of additional groups of Formula (II) and/or with metal atoms of one or several of the cross-linking bridge-type cross links:

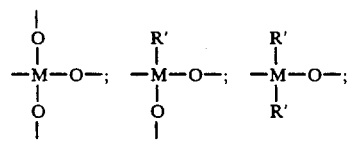

or

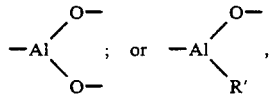

wherein M is a silicon, titanium or zirconium atom and R' is a linear or branched alkyl group with 1 to 5 carbon atoms, and the ratio of the silicon atoms from the groups of Formula (II) to the metal atoms in the bridge-type cross links is from 1:0 to 1:10; wherein $R^3$ is selected from the group consisting of $R^1$, $R^2$, hydrogen, a linear or branched alkyl group of 1 to 20 carbon atoms, a cycloalkyl group having 5 to 8 carbon atoms, and a benzyl group; $R^4$ is selected from the group consisting of hydrogen, a linear or branched alkyl group with 1 to 20 carbon atoms, a cycloalkyl group, a benzyl group, an allyl group, a propargyl group, a chloroethyl group, a hydroxyethyl group, and a chloropropyl group; and X is an oxo anion with a charge number x, wherein X is an anion of a monooxoacid, an isopolyoxoacid or a heteropolyoxo acid of the elements vanadium, niobium, tantalum, molybdenum or tungsten, wherein one or several oxo groups of the anion may be replaced by a peroxo group, and wherein an element selected from the series of boron, silicon, germanium, phosphorus, arsenic, iodine, tellurium, tin, titanium, zirconium, hafnium and cerium functions as a heteroatom in the heteropolyoxy acids.

2. The process in accordance with claim 1, wherein in the polymeric organosiloxane ammonium salt, the salts are present in the form of macroscopically spherical particles having a diameter in the range of 0.01 to 3 mm, a specific surface according to BET of greater than 0 to 1000 m²/g, a specific pore volume of greater than 0 to 6 ml/g, a bulk density of 100 to 1000 g/l and a volume density of dry substance of 100 to 900 g/l.

3. The process according to claim 1, wherein X in the polymeric organosiloxane ammonium salt is selected from the group consisting of mono-, hexa-, dodecatungstates; mono-, hexa-, hepta- and octamolybdates; tungstophosphate; tungstosilicate; or tungstoborate.

4. The process according to claim 3, wherein X is tungstate or tungstophosphate.

5. The process according to claim 1, wherein in the polymeric organosiloxane ammonium salt, $R^1$, $R^2$ and $R^3$ are identical and represent groups according to Formula (II), wherein $R^5$ represents a linear or branched alkylene group and $R^4$ represents hydrogen or a methyl group.

6. The process according to claim 1, wherein the polymeric organosiloxane ammonium salt includes units of the formula:

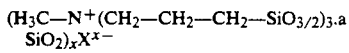
(H$_3$C—N$^+$(CH$_2$—CH$_2$—CH$_2$—SiO$_{3/2}$)$_3$·a SiO$_2$)$_x$X$^{x-}$ or

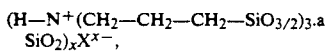
(H—N$^+$(CH$_2$—CH$_2$—CH$_2$—SiO$_{3/2}$)$_3$·a SiO$_2$)$_x$X$^{x-}$, in which "a" is a value from 0 to 3.

7. The process according to claim 1, further comprising recovering glycide after the contacting step.

8. A process for preparing glycide by epoxidation of allyl alcohol, comprising:
contacting a mixture of allyl alcohol, water and hydrogen peroxide with a fixed catalytic bed to thereby form glycide, wherein the catalytic bed to includes a polymeric organosiloxane ammonium salt of an oxo acid having a silica-like skeleton, the salt having units of Formula (I):

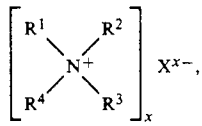

wherein $R^1$ and $R^2$ are identical or different and represent a group of Formula (II):

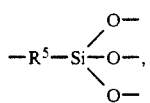

wherein the nitrogen atom in Formula (I) is connected via the $R^5$ group to the silicon atom in Formula (II), and $R^5$ is chosen from the group consisting of an alkylene group with 1 to 10 carbon atoms, a cycloalkylene group with 5 to 8 carbon atoms and a unit of one of the formulae:

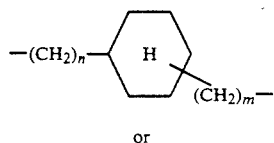

or

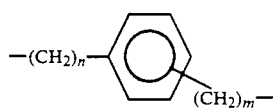

wherein n is a number from 1 to 6 and indicates the number of methylene groups in the nitrogen position and m is a number from 0 to 6; the free valences of the oxygen atoms bound to the silicon atom in Formula (II) are saturated by silicon atoms of additional groups of Formula (II) and/or with metal atoms of one or several of the cross-linking bridge-type cross links:

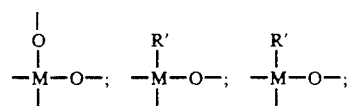

or

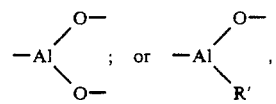

wherein M is a silicon, titanium or zirconium atom and R' is a linear or branched alkyl group with 1 to 5 carbon atoms, and the ratio of the silicon atoms from the groups of Formula (II) to the metal atoms in the bridge-type cross links is from 1:0 to 10; wherein $R^3$ is selected from the group consisting of $R^1$, $R^2$, hydrogen, a linear or branched alkyl group of 1 to 20 carbon atoms, a cycloalkyl group having 5 to 8 carbon atoms, and a benzyl group; $R^4$ is selected from the group consisting of hydrogen, a linear or branched alkyl group with 1 to 20 carbon atoms, a cycloalkyl group, a benzyl group, an allyl group, a propargyl group, a chloroethyl group, a hydroxyethyl group, and a chloropropyl group; and X is an oxo anion with a charge number x, wherein X is an anion of a monooxoacid of the elements vanadium, niobium, tantalum, molybdenum or tungsten, wherein one or several oxo groups of the anion may be replaced by a peroxo group.

9. The process in accordance with claim 8, wherein in the polymeric organosiloxane ammonium salt, the salts are present in the form of macroscopically spherical particles having a diameter in the range of 0.01 to 3 mm, a specific surface according to BET of greater than 0 to 1000 m$^2$/g, a specific pore volume of greater than 0 to 6 ml/g, a bulk density of 100 to 1000 g/l and a volume density of dry substance of 100 to 900 g/l.

10. The process according to claim 8, wherein X in the polymeric organosiloxane ammonium salt is selected from the group consisting of monotungstate and monomolybdate.

11. The process according to claim 10, wherein X is monotungstate.

12. The process according to claim 8, wherein in the polymeric organosiloxane ammonium salt, $R^1$, $R^2$ and $R^3$ are identical and represent groups according to Formula (II), wherein $R^5$ represents a linear or branched alkylene group and $R^4$ represents hydrogen or a methyl group.

13. The process according to claim 8, wherein the polymeric organosiloxane ammonium salt includes units of the formula:

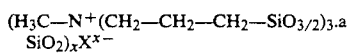
(H$_3$C—N$^+$(CH$_2$—CH$_2$—CH$_2$—SiO$_{3/2}$)$_3$·a SiO$_2$)$_x$X$^{x-}$ or

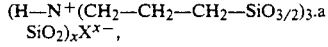
(H—N$^+$(CH$_2$—CH$_2$—CH$_2$—SiO$_{3/2}$)$_3$·a SiO$_2$)$_x$X$^{x-}$, in which "a" is a value from 0 to 3.

14. The process according to claim 8, further comprising recovering glycide after the contacting step.

* * * * *